(12) United States Patent
Lennen (10) Patent No.: US 10,408,943 B2
(45) Date of Patent: Sep. 10, 2019

(54) METHOD AND APPARATUS FOR IMPROVING POSITION-VELOCITY SOLUTION IN GNSS RECEIVERS

(71) Applicant: Samsung Electronics Co., Ltd., Suwon-si, Gyeonggi-do (KR)

(72) Inventor: Gary Lennen, Cupertino, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 303 days.

(21) Appl. No.: 15/585,148

(22) Filed: May 2, 2017

(65) Prior Publication Data

US 2018/0224555 A1 Aug. 9, 2018

Related U.S. Application Data

(60) Provisional application No. 62/457,151, filed on Feb. 9, 2017.

(51) Int. Cl.
*G01S 19/38* (2010.01)
*G01S 19/39* (2010.01)
*G01S 19/42* (2010.01)
*G01S 19/52* (2010.01)

(52) U.S. Cl.
CPC .............. *G01S 19/39* (2013.01); *G01S 19/42* (2013.01); *G01S 19/52* (2013.01)

(58) Field of Classification Search
CPC .......... G01S 19/20; G01S 19/38; G01S 19/39; G01S 19/42; G01S 19/52
USPC .................................................... 342/357.58
See application file for complete search history.

(56) References Cited

U.S. PATENT DOCUMENTS

| | | | |
|---|---|---|---|
| 9,322,900 B2 | 4/2016 | Sendonaris et al. | |
| 9,360,559 B2 | 6/2016 | MacGougan | |
| 9,398,558 B2* | 7/2016 | Morgan | G01S 5/02 |
| 9,513,374 B2 | 12/2016 | Deshpande et al. | |
| 2005/0064879 A1* | 3/2005 | McAvoy | H04W 64/00 455/456.1 |
| 2014/0121963 A1 | 5/2014 | Buck et al. | |
| 2014/0288824 A1* | 9/2014 | Huttunen | G01C 21/165 701/472 |

\* cited by examiner

*Primary Examiner* — Dao L Phan
(74) *Attorney, Agent, or Firm* — Renaissance IP Law Group LLP (57) ABSTRACT

Embodiments include a method and apparatus for improving a position-velocity solution in GNSS receivers. A receiver of a mobile device includes an antenna that receives one or more signals from one or more satellites, a measurement layer produces range and range rate measurements dependent on the one or more signals, and a storage device stores historic satellite measurement states dependent on the range and range rate measurements. The receiver may further include a Kalman filter logic section may receive the range and range rate measurements, and to smooth computed motion of the mobile device. The storage device may store historic filter states. A filter adjustment logic section may detect a measurement layer error trigger, remove or de-weight errant information associated with the measurement layer error trigger, and cause the filter logic section to update a current filter state by iteratively applying the filter logic section to the historic filter states.

27 Claims, 7 Drawing Sheets

METHOD AND APPARATUS FOR IMPROVING POSITION-VELOCITY SOLUTION IN GNSS RECEIVERS

RELATED APPLICATION DATA

This application claims the benefit of U.S. Provisional Patent Application Ser. No. 62/457,151, filed on Feb. 9, 2017, which is hereby incorporated by reference.

FIELD

The present disclosure is generally related to a receiver, and in particular, to a method and apparatus for improving a position-velocity solution in a global navigation satellite system (GNSS) receiver.

BACKGROUND

A Kalman filter is commonly used in a global navigation satellite system (GNSS) receiver to smooth the computed user motion (e.g., position, velocity, and time). A Kalman filter provides a process that uses a series of measurements observed over time, containing statistical noise and other inaccurate measurements, and provides an estimate of unknown variables that tend to be more precise than those based on a single measurement alone. The estimate may be based on Bayesian inference and estimating a joint probability distribution over the variables for each time frame.

A Kalman filter works in a two-step process. In the prediction step, the Kalman filter produces estimates of the current state variables, along with their uncertainties. Once the outcome of a subsequent measurement (probably corrupted with some amount of error, including random noise) is observed, these estimates are updated using a weight average, with less weight being given to estimates with higher uncertainty. The Kalman filter process is recursive, and runs in real time, using the present input measurements and the previously calculated state and its uncertainty matrix. A Kalman filter is typically updated at a 1 Hertz (Hz) rate with example inputs being range and range rate measurements made to each of the available satellites.

Essentially, a Kalman filter is a weighting between the immediate previous Kalman filter output and updated measurements. Furthermore, the measurements themselves are weighted according to expected or measured noise. The measurement layer in a receiver may be defined as the method and apparatus that produces range and range rate measurements as an input to the navigation solution process. The measurement layer may provide an independent estimate of errors present in the range and range errors. Such estimate of errors may be described herein as measurement layer error metrics.

Measurement layer metrics may include satellite health, distorted correlation metrics, frequency tracking offset detection, poor network aiding information, and declining carrier-to-noise ratio (CNO). The Kalman filter is not perfect in the sense that un-modeled measurement errors can cause the measurements to diverge from the true position and velocity. In the real world, this may be indicated by a user seeing a map navigation on the wrong street.

SUMMARY

Embodiments may include a GNSS receiver of a mobile device. The receiver may include an antenna configured to receive one or more signals from one or more satellites, a measurement layer configured to produce range and range rate measurements dependent on the one or more signals, and a storage device configured to store historic satellite measurement states dependent on the range and range rate measurements. The receiver may include a filter logic section, such as a Kalman filter, configured to receive the range and range rate measurements, and to smooth computed motion of the mobile device. The storage device may store historic filter states. The receiver may include a filter adjustment logic section configured to detect a measurement layer error trigger, to remove or de-weight errant information associated with the measurement layer error trigger, and to cause the filter logic section to update a current filter state by iteratively applying the filter logic section to the historic filter states.

Embodiments include a method for improving a position-velocity solution in a receiver of a mobile device. The method may include receiving, by an antenna, one or more signals from one or more satellites. The method may include producing, by a measurement layer, range and range rate measurements dependent on the one or more signals. The method may include storing, by a storage device, historic satellite measurement states dependent on the range and range rate measurements. The method may include receiving, by a filter logic section, the range and range rate measurements. The method may include smoothing, by the filter logic section, computed motion of the mobile device. The method may include storing, by the storage device, historic filter states. The method may include detecting, by a filter adjustment logic section, a measurement layer error trigger. The method may include removing or de-weighting, by the filter adjustment logic section, errant information associated with the measurement layer error trigger. The method may include causing, by the filter adjustment logic section, the filter logic section to update a current filter state by iteratively applying the filter logic section to the historic filter states.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to various embodiments, examples of which are illustrated in the accompanying drawings. In the following detailed description, numerous specific details are set forth to enable a thorough understanding of the embodiments. It should be understood, however, that persons having ordinary skill in the art may practice the embodiments without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first filter state could be termed a second filter state, and, similarly, a second filter state could be termed a first filter state, without departing from the scope of the embodiments.

The terminology used in the description of the embodiments herein is for the purpose of describing particular embodiments only and is not intended to be limiting of the embodiments. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

According to some embodiments, the present system and method allows measurement layer metrics, or other external metrics, to impact a current Kalman filter output by allowing a certain time history of the Kalman filter to be run under modified conditions. The present system maintains a history of Kalman filter and measurement states such that the current Kalman filter state can be recomputed based on later attained information regarding potential errors over a recent time period.

Range and range rate errors may not be detected and mitigated by the Kalman filter and the navigation layer in general. By the time range or range rate errors are detected in the measurement layer they may have persisted for some time and skewed the output of the Kalman filter. Failure to detect errors may be due to random noise considerations or something as simple as tracking a non-line of sight (NLOS) signal.

Figure 1:
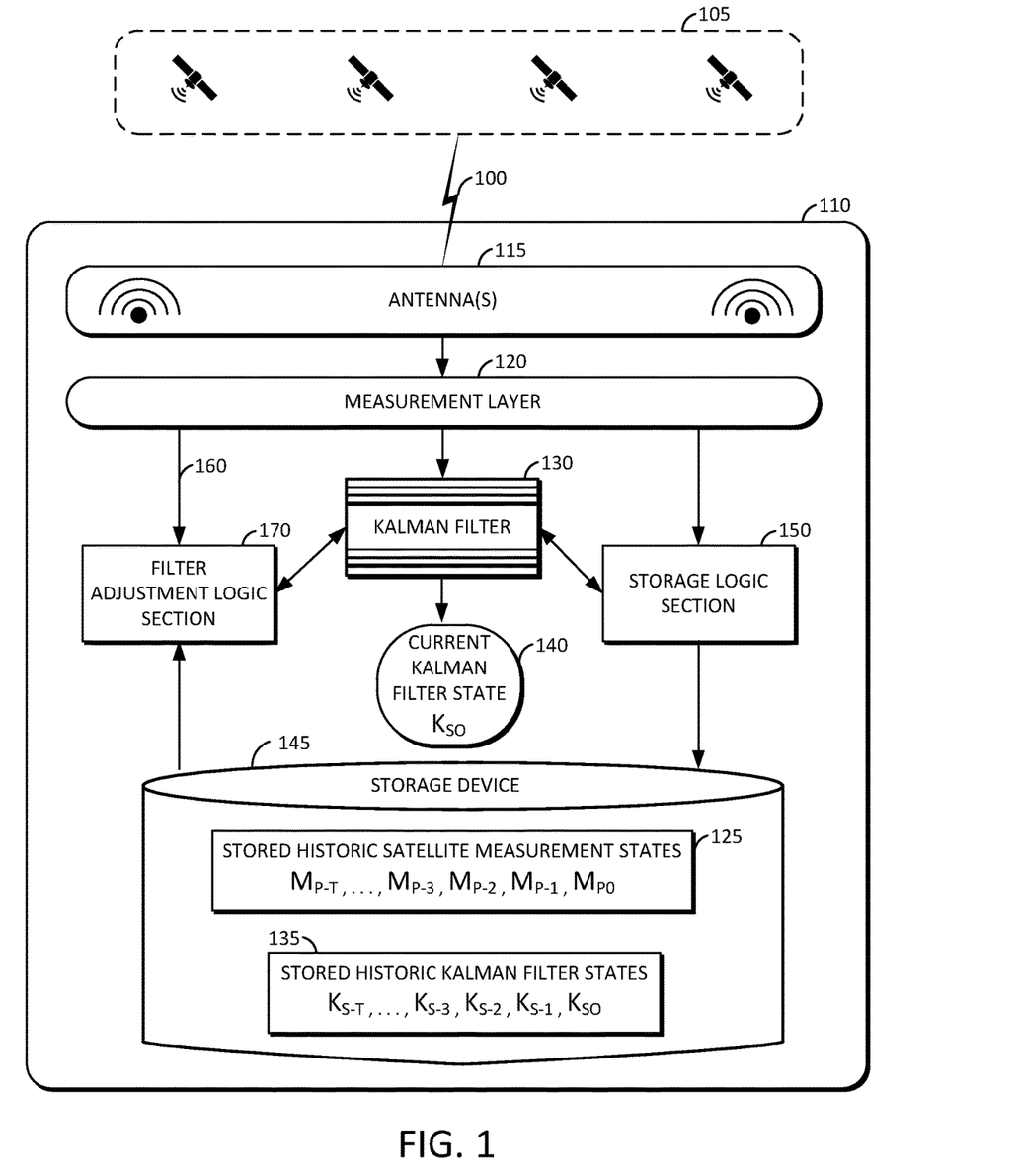
FIG. 1 is an example block diagram of a receiver of a mobile device in accordance with some embodiments.

FIG. 1 is an example block diagram of a receiver 110 of a mobile device in accordance with some embodiments. In some embodiments, the receiver 110 is a GNSS receiver 110. The receiver 110 may include one or more antennas 115. The one or more antennas 115 may receive one or more signals 100 from one or more satellites 105. The receiver 110 may include a measurement layer 120, which may produce range and range rate measurements dependent on the one or more signals 100. The receiver 110 may include a storage device 145 to store historic satellite measurement states 125 dependent on the range and range rate measurements, as further described below. The receiver 110 may include a Kalman filter logic section 130, sometimes referred to herein as simply a Kalman filter, which may receive the range and range rate measurements from the measurement layer 120. It will be understood that other suitable filters can be used in place of the Kalman filter without departing from the scope of the present disclosure. The Kalman filter logic section 130 may smooth computed motion of a mobile device. The storage device 145 may store historic Kalman filter states 135, as further described below. The storage device 145 may be any suitable kind of storage device, such as a random access memory (RAM), a non-volatile memory such as a flash memory, a solid state drive (SSD), a hard disk drive, or the like.

In some embodiments, the receiver 110 may include a filter adjustment logic section 170. The filter adjustment logic section 170 may detect a measurement layer error trigger 160 received from the measurement layer 120. The filter adjustment logic section 170 may remove or de-weight errant information in the one or more signals 100 associated with the measurement layer error trigger 160. The filter adjustment logic section 170 may be a Kalman filter adjustment logic section 170. The filter adjustment logic section 170 may cause the Kalman filter logic section 130 to update a current Kalman filter state 140 by iteratively applying the Kalman filter logic section 130 to the historic Kalman filter states 135.

The receiver 110 may include a storage logic section 150 that is communicatively coupled to the measurement layer 120. The storage logic section 150 may cause the storage device 145 to periodically store the range and range rate measurements in historic satellite measurement states 125 including discrete time-based measurement states.

The storage logic section 150 may be communicatively coupled to the Kalman filter logic section 130. The storage logic section 150 may cause the storage device 145 to periodically store the current Kalman filter state 140 in historic Kalman filter states 135 including discrete time-based Kalman filter states.

In some embodiments, the receiver 110 may use the previously stored historic Kalman filter states 135 and the previously stored historic satellite measurement states 125 to return back in time to a previous time point where a satellite (e.g., the satellite 105) was not tracking a non-line of sight (NLOS) signal. Alternatively or in addition, the filter adjustment logic section 170 may remove or significantly de-weight the satellite 105 or the signal 100 associated therewith. The receiver 110 may then run a Kalman filter update from the previous time point to a current time. By removing, de-weighting, or otherwise altering the signal 100 (e.g., the measurement layer detected error satellite signal), the current Kalman filter state 140 and output solution may be improved, thereby improving the real-time solution or past history of solutions. The receiver 110 may further drop one or more of range rate measurements and a range from a particular satellite 105. The receiver 110 may further drop the satellite 105 or the signal 100 associated therewith further back in time to further lessen the influence of the satellite 105 on the current solution.

For example, for a 1 Hz nominal real-time Kalman filter output, and returning back in time (e.g., 20 seconds), the receiver 110 may propagate the Kalman filter states forward using 1 second separated measurements. In some embodiments, only the earliest Kalman filter state from among the stored historic Kalman filter states 135 is used together with the stored historic satellite measurement states 125 associated with previous measurements. The Kalman filter logic section 130 can be propagated to current time using another rate (e.g., every 2 seconds) to speed up the process. It will be understood that any suitable rate such as every 1 second, every 2 seconds, every 3 seconds, every 4 seconds, every 5 seconds, and so forth can be used.

Kalman states may be given by $K_{s-t}, \ldots, K_{s-3}, K_{s-2}, K_{s-1}, K_{s0}$, where $-t$ is a Kalman state at a previous time point (i.e., t seconds ago). Satellite measurements for a given satellite $SV_P$ may be given by $M_{p-t}, \ldots, M_{p-3}, M_{p-2}, M_{p-1}, M_{p0}$.

In some embodiments, the receiver 110 maintains a current Kalman filter update at a constant rate (e.g., 1 Hz). The receiver 110 may detect a measurement layer metric trigger 160, such as a large range error via sudden line of sight (LOS) detection. The receiver 110 may set the Kalman filter state back by $-t$ seconds. The receiver 110 may further forward compute the Kalman filter states 135 to a current time using time history of measurements, while storing an updated history of Kalman filter states 135 along the way. The updated current Kalman solution is improved over a standard Kalman output. It is noted that the forward time projection of the Kalman filter may be using any suitable time intervals (e.g., 1 second per computation, 2 seconds per computation, 3 seconds per computation, 4 seconds per computation, 5 seconds per computation, and so forth) without deviating from the scope of the present disclosure.

For example, the receiver 110 may detect a range error of 300 meters on a satellite 105 that has been tracking for 10 seconds. The receiver 110 may return to a Kalman filter state that is 10 seconds ago (i.e., at $t-10$) and re-run the Kalman filter logic section 130 with measurements at times $t-10$, $t-9$, $t-8$, ... until a current time t. The Kalman filter logic section 130 may update at other rates (e.g., >1 Hz, 10 Hz, <1 Hz, 0.1 Hz, or the like), depending on an application requirement, without deviating from the scope of the present disclosure. Multiple satellites 105 may have measurement layer errors triggered during any particular second and may be handled differently in the Kalman filter logic section 130 depending on the type and severity of the indicated error.

The storage of the historic Kalman filter states 135 may include the specific Kalman internal and external equation states, as well as any other parameters associated with maintaining the current Kalman filter state 140 in the receiver 110. The storage of the historic satellite measurement states 125 may include, for each satellite, internal and external measurements, as well as any other parameters associated with maintaining the measurement state in the receiver 110.

According to some embodiments, the receiver 110 may detect a stationary or static state, i.e., one in which the mobile device is not significantly moving locations, and re-asses the Kalman filter output solution state. This operation may occur during a static mode of the receiver 110. During the static mode, the receiver 110 may take the opportunity to go over different examples of the historic Kalman filter states 135. For example, the receiver 110 may re-run the Kalman filter logic section 130 for a predefined previous period of time, such as for the previous 10 seconds, with different combinations of satellites 105. Alternatively or in addition, the receiver 110 may re-run the Kalman filter 130 for the predefined previous period of time without using relatively weak or relatively very weak CNO satellites. This can be used to improve the position solution while velocity is zero and position is not being otherwise updated.

In some embodiments, the static mode update can include bad satellite isolation. In this case, the receiver 110 may detect a static period instead of a measurement layer metric trigger to re-run the Kalman filter logic section 130. In some embodiments, the receiver 110 may return to a previously stored Kalman filter state, and re-run the Kalman filter logic section 130 to a current time to improve differential and real time kinematic (RTK) position solutions.

More specifically, the filter adjustment logic section 170 may run a Kalman filter update starting from a $K_{S-T}$ historic filter state from among the historic Kalman filter states 135, wherein T is a predefined number of lapsed seconds relative to a current time. The filter adjustment logic section 170 may run the Kalman filter update by iteratively applying the Kalman filter logic section 130 to the historic Kalman filter states 135 ending with an improved Kalman filter state $K_{SO}$. The improved Kalman filter state $K_{SO}$ may be an updated current Kalman filter state associated with a current time. It will be understood that other kinds of filters besides a Kalman filter can be used without departing from the scope of the present disclosure. For example, a real time kinematic (RTK) filter or other suitable filter can be used in place of the Kalman filter logic section 130.

The filter adjustment logic section 170 may remove or de-weight the errant information associated with the historic satellite measurement states 125 responsive to the measurement layer error trigger 160. The filter adjustment logic section 170 may run the Kalman filter update while referencing the historic satellite measurement states 125 after the errant information has been removed or de-weighted from the historic satellite measurement states 125. The filter adjustment logic section 170 may receive the measurement layer error trigger 160 from the measurement layer 120. The filter adjustment logic section 170 may remove from consideration or de-weight the signal 100 from among the one or more satellites 105 having associated therewith the errant information.

The historic satellite measurement states 125 may include $M_{P-T}, \ldots, M_{P-3}, M_{P-2}, M_{P-1}, M_{P0}$. The historic Kalman filter states 135 may include $K_{S-T}, \ldots, K_{S-3}, K_{S-2}, K_{S-1}, K_{SO}$. The filter adjustment logic section 170 may receive the historic satellite measurement states $M_{P-T}, \ldots, M_{P-3}, M_{P-2}, M_{P-1}, M_{P0}$ and the historic filter states $K_{S-T}, \ldots, K_{S-3}, K_{S-2}, K_{S-1}, K_{SO}$ from the storage device 145, and may cause the Kalman filter logic section 130 to update the current Kalman filter state 140 by iteratively applying the Kalman filter logic section 130 to the historic filter states $K_{S-T}, \ldots, K_{S-3}, K_{S-2}, K_{S-1}, K_{SO}$ for each second (or other suitable time interval) in past time while referencing the historic satellite measurement states $M_{P-T}, \ldots, M_{P-3}, M_{P-2}, M_{P-1}, M_{P0}$ after the errant information has been removed or de-weighted from the historic satellite measurement states $M_{P-T}, \ldots, M_{P-3}, M_{P-2}, M_{P-1}, M_{P0}$.

In the absence of the measurement layer error trigger 160, the Kalman filter logic section 130 may run a Kalman filter $K_{TH}$ state update to update the current Kalman filter state $K_{SO}$ 140 for a current time $T_K$ without iteratively applying the Kalman filter logic section 130 to the historic filter states 135 stored in the storage device 145.

During a static period in which position information of the mobile device is not being updated, the filter adjustment logic section 170 may review the historic Kalman filter states 135 in view of different combinations of the one or more signals 100 from the one or more satellites 105 to improve a position solution.

Figure 2:
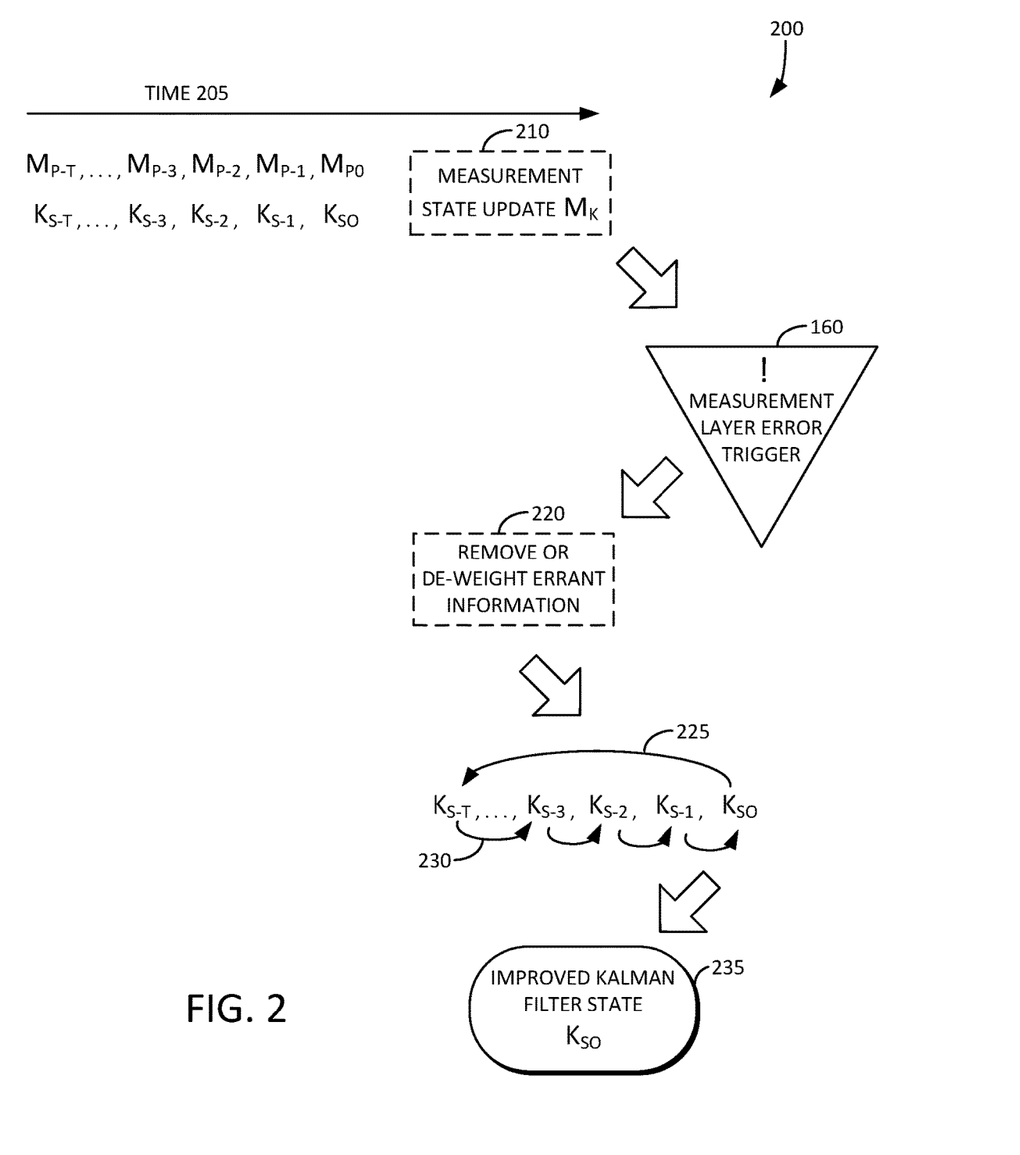
FIG. 2 is an example block and flow diagram showing a technique for improving a current Kalman filter state in accordance with some embodiments.

FIG. 2 is an example block and flow diagram 200 showing a technique for improving a current Kalman filter state in accordance with some embodiments. A time line 205 shows the historic satellite measurement states $M_{p-T}, \ldots, M_{p-3}, M_{p-2}, M_{p-1}, M_{p0}$ and the historic Kalman filter states $K_{s-T}, \ldots, K_{s-3}, K_{s-2}, K_{s-1}, K_{s0}$ as they are recorded and stored over time. At 210, a measurement state update $M_K$ may occur, which in some cases, may cause a measurement layer error trigger 160. At 220, responsive to the trigger 160, the filter adjustment logic section (e.g., 170 of FIG. 1) may remove or de-weight errant information associated with the historic satellite measurement states $M_{p-T}, \ldots, M_{p-3}, M_{p-2}, M_{p-1}, M_{p0}$. This can involve removing or de-weighting a satellite (e.g., the satellite 105 of FIG. 1) from consideration, or otherwise altering position or velocity data derived from its signals (e.g., the signal 100 of FIG. 1). At 225, the filter adjustment logic section 170 can go backward in time, and cause a Kalman update to be iteratively performed from a previously stored Kalman state (e.g., $K_{S-T}$) to a present Kalman state (e.g., $K_{SO}$) at 230. In this manner, the current Kalman filter state $K_{SO}$ 140 (of FIG. 1) can be an improved Kalman filter state $K_{SO}$ 235. Consequently, a position-velocity solution may be improved in a receiver (e.g., 110 of FIG. 1) of a mobile device.

Figure 3A:
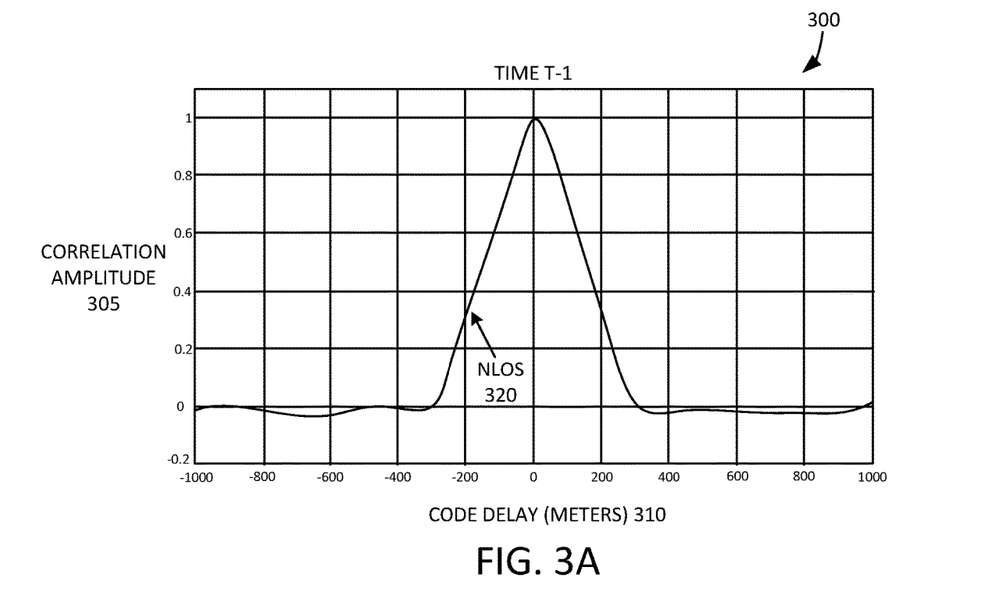
FIG. 3A is an example graph of measurement layer error detection including a non-line of sight (NLOS) curve at time T−1 in accordance with some embodiments.
Figure 3B:
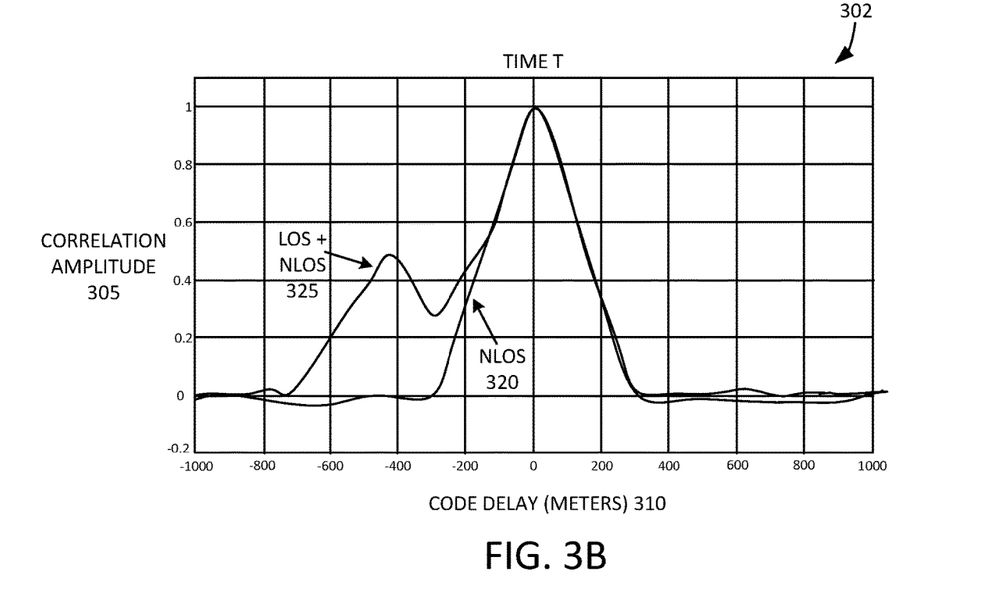
FIG. 3B is an example graph of measurement layer error detection including a non-line of sight (NLOS) curve and a line of sight (LOS) curve at time T in accordance with some embodiments.

FIG. 3A is an example graph 300 of measurement layer error detection including a non-line of sight (NLOS) curve at time T−1 in accordance with some embodiments. FIG. 3B is an example graph 302 measurement layer error detection including a non-line of sight (NLOS) curve and a line of sight (LOS) curve at time T in accordance with some embodiments. Reference is now made to FIGS. 3A and 3B. The X-axis of each graph represents code delay (meters) 310. The Y-axis of each graph represents correlation amplitude 305.

As mentioned above, the Kalman filter is not perfect in the sense that un-modeled measurement errors can cause the measurements to diverge from the true position and velocity. In the real world, this may be indicated by a user seeing a map navigation on the wrong street. Such errant information can be caused, for example, by a large building blocking line of sight between a mobile device and a satellite. The receiver can go for many seconds thinking everything is fine, when in fact it was receiving errant measurement information, which itself was being fed into the Kalman filter. The Kalman filter process is recursive, and runs in real time, using the present input measurements and the previously calculated state. If a span of seconds passes in an errant environment with the Kalman filter building on each new second in time, this leads to a less accurate current state of the Kalman filter, which is less aligned with reality. The longer the errant information persists in time, the more the Kalman filter can become positionally offset. The more recent errant information weighs more heavily on the Kalman filter than errant information in the distant past.

For example, at time T−1, as shown in graph 300 of FIG. 3A, the receiver is tracking a NLOS 320 signal, i.e., the correlation function between a satellite and the local code replica. At time T, as shown in graph 302 of FIG. 3B, 1 second later, the receiver detects that an earlier peak is present as shown by the LOS+NLOS signal 325. In this case, the receiver can determine that the earlier peak is caused by the LOS signal. Therefore, prior to time T, it can be assumed that the receiver has been tracking a NLOS signal that has significant range error and potentially range rate error.

This is an example scenario in which the measurement layer (e.g., 120 of FIG. 1) may generate a measurement layer error trigger (e.g., 160 of FIG. 1), thereby setting into motion the operation of the filter adjustment logic section (e.g., 170 of FIG. 1). And before running the Kalman filter update, the filter adjustment logic section 170 can use a measurement offset (e.g., by approximately −400 meters) while stepping through the stored historic Kalman filter states (e.g., 135 of FIG. 1), thereby leading to an improved current Kalman filter state $K_{SO}$ (e.g., 140 of FIG. 1).

Figure 4:
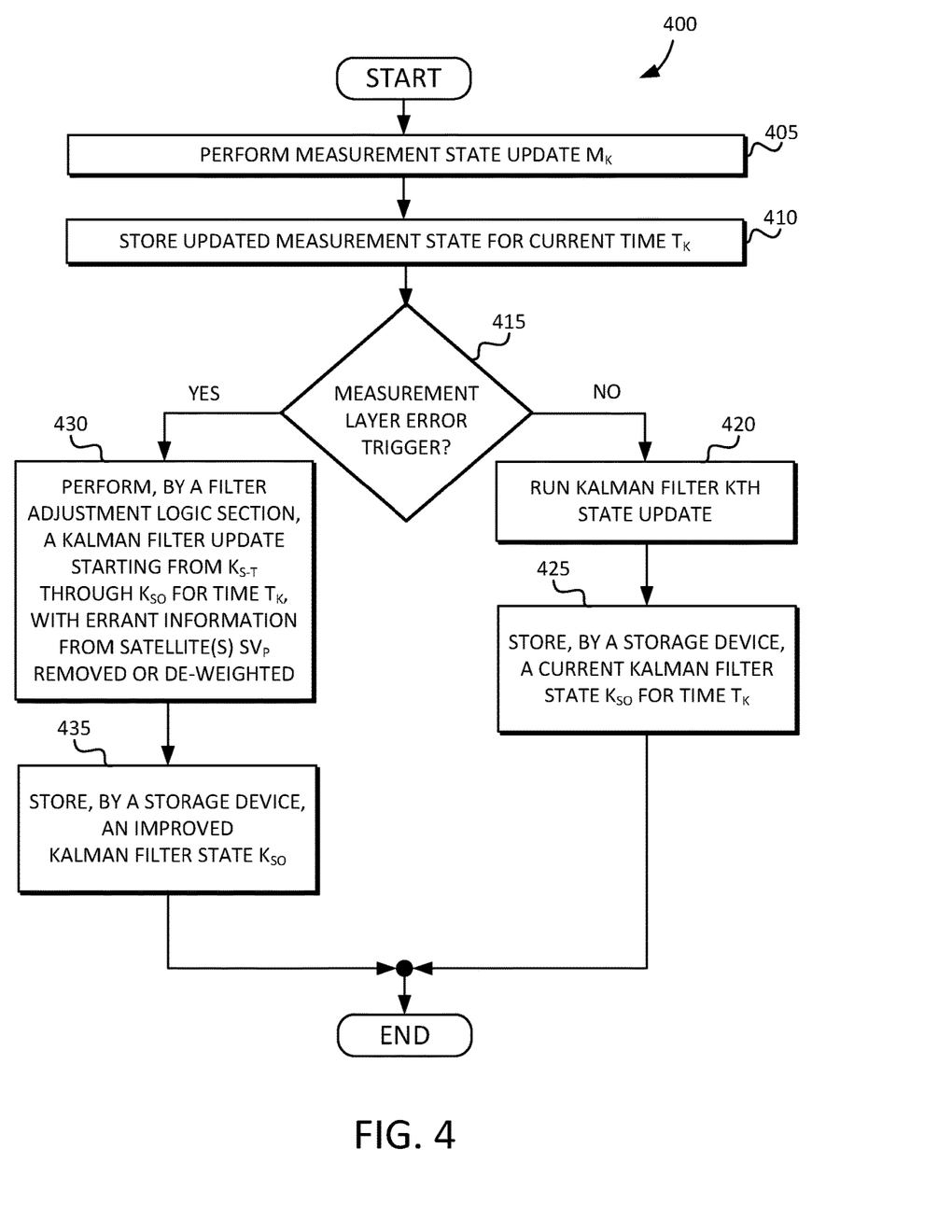
FIG. 4 is flow diagram illustrating a technique for improving a position-velocity solution in a receiver of a mobile device in accordance with some embodiments.

FIG. 4 is flow diagram 400 illustrating a technique for improving a position-velocity solution in a receiver 110 of a mobile device in accordance with some embodiments. At 405, the present system performs a measurement state update $M_K$. At 410, the present system stores an updated measurement state for current time $T_K$. At 415, the present system determines whether a measurement layer error trigger has been generated. If a measurement layer error trigger has been generated, a filter adjustment logic section of the present system may perform, or cause to be performed, a Kalman filter update starting from $K_{S-T}$ through $K_{s0}$ for time $T_K$, with errant information from one or more satellites $SV_P$ removed or de-weighted at 430. At 435, a storage device (e.g., 145 of FIG. 1) of the present system may store an improved Kalman filter state $K_{SO}$. If a measurement layer error trigger has not been detected, the filter adjustment logic section performs a Kalman filter $K_{TH}$ state update at 420. At 425, the storage device 145 stores a current Kalman filter state $K_{SO}$ for time $T_K$.

Accordingly, the position and/or velocity solution in a GNSS receiver (e.g., 110) is improved, using previously stored Kalman filter measurement states 135 (of FIG. 1), including detecting a trigger (e.g., 160 of FIG. 1) having a pre-determined range error on a satellite (e.g., 105 of FIG. 1) that has been tracking for a time period T, setting a Kalman filter state back by the time period T, determining (e.g., re-running) the Kalman filter states from the previous time period T until the current time by removing or de-weighting the satellite (e.g., 105 of FIG. 1) using the previously stored Kalman filter measurement states (e.g., 135 of FIG. 1) at a specified or configurable rate, and/or storing an updated history of Kalman states 135 along the way. The trigger (e.g., 160 of FIG. 1) may be related to various types of events, include an appearance of a signal LOS peak, which may point to prior use of a signal that is only NLOS and hence with large error, and/or a stationary state.

Figure 5:
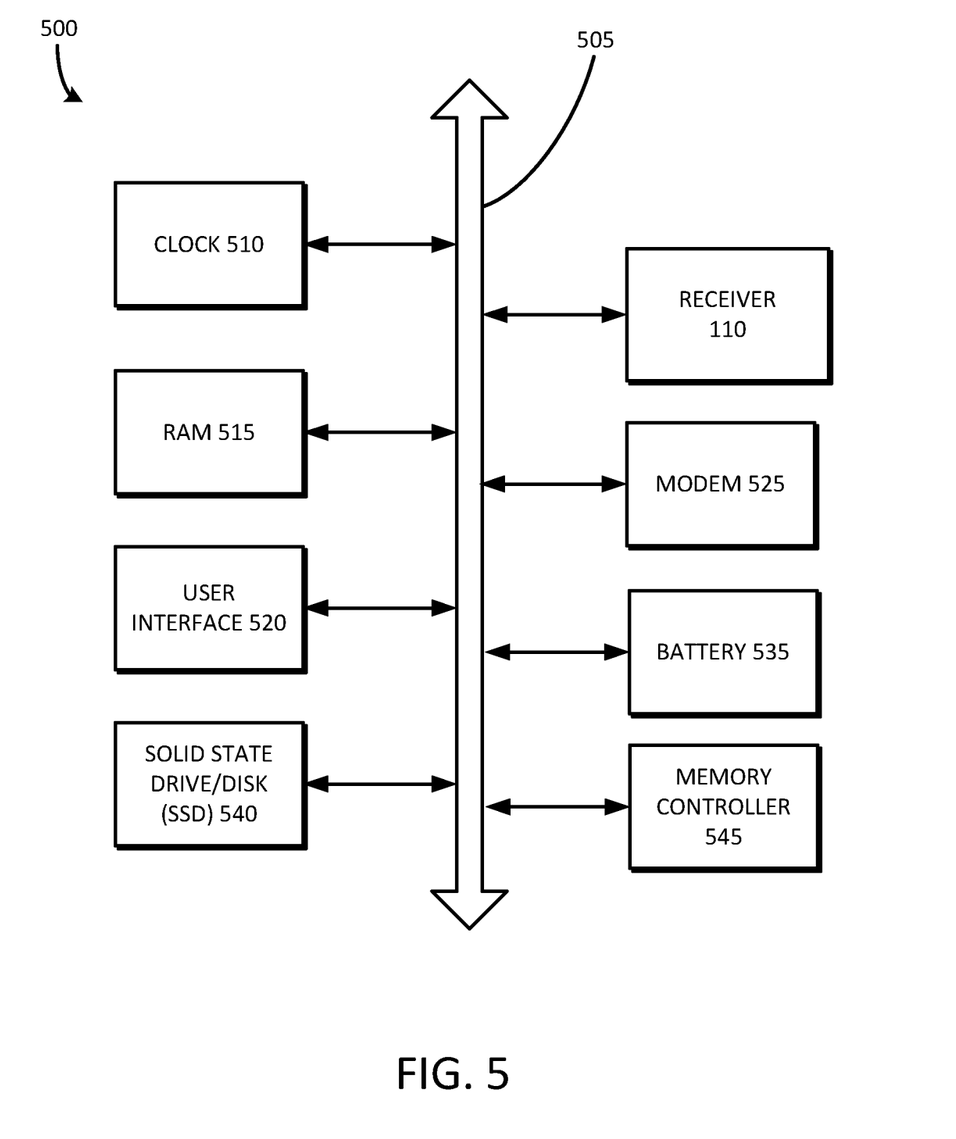
FIG. 5 is a block diagram of a computing system including the receiver of FIG. 1.

FIG. 5 is a block diagram of a computing system 500 including the receiver 110 of FIG. 1 according to embodiments disclosed herein. Referring to FIG. 5, the computing system 500 may include a clock 510, a random access memory (RAM) 515, a user interface 520, a modem 525 such as a baseband chipset, a solid state drive/disk (SSD) 540, a memory controller 545, and/or a battery 535, any or all of which may be electrically coupled to a system bus 505. The receiver 110 may correspond to those embodiments described in detail above, and may also be electrically coupled to the system bus 505.

If the computing system 500 is a mobile device, the battery 535 may power the computing system 500. Although not shown in FIG. 5, the computing system 500 may further include an application chipset, a camera image processor (CIS), a mobile DRAM, and the like.

In example embodiments, the computing system 500 may be used as a portable computer, Ultra Mobile PC (UMPC), net-book, personal digital assistant (PDA), web tablet, wireless phone, mobile phone, smart phone, e-book, portable multimedia player (PMP), digital camera, digital audio recorder/player, digital picture/video recorder/player, portable game machine, navigation system, black box, a device capable of transmitting and receiving information at a wireless circumstance, or one of various electronic devices constituting a computing system.

Figure 6:
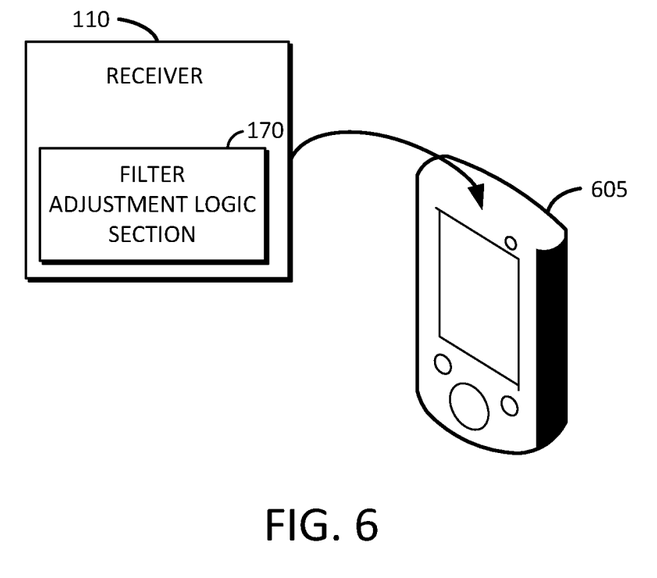
FIG. 6 is a schematic diagram of a mobile smart phone including the receiver of FIG. 1.

FIG. 6 is a schematic diagram of a mobile smart phone 605 including the receiver of FIG. 1. The smart phone 605 may include the receiver 110 of FIG. 1, which may include the filter adjustment logic section 170 and other components described in detail above.

Figure 7:
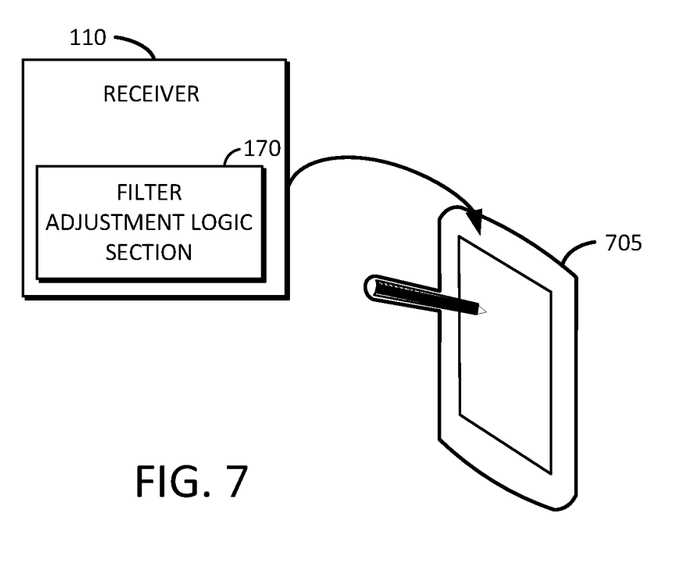
FIG. 7 is a schematic diagram of a mobile tablet including the receiver of FIG. 1.

FIG. 7 is a schematic diagram of a mobile tablet 705 including the receiver of FIG. 1. The mobile tablet 705 may include the receiver 110 of FIG. 1, which may include the filter adjustment logic section 170 and other components described in detail above.

Figure 8:
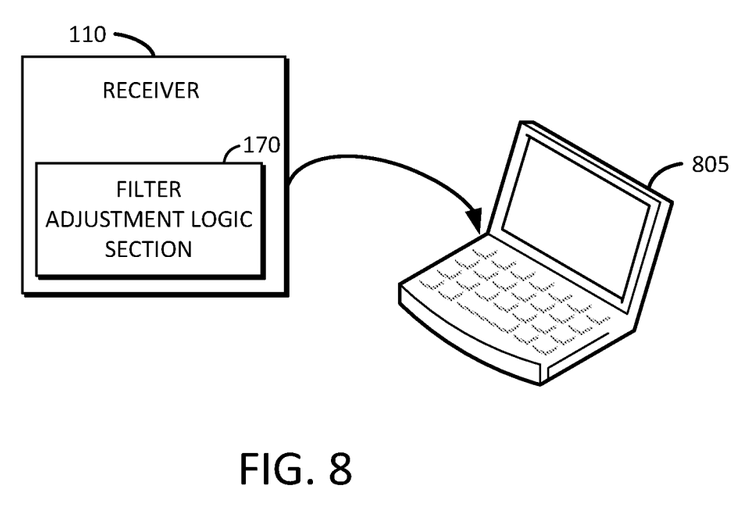
FIG. 8 is a schematic diagram of a mobile laptop computer including the receiver of FIG. 1.

FIG. 8 is a schematic diagram of a mobile laptop computer 805 including the receiver of FIG. 1. The mobile laptop computer 805 may include the receiver 110 of FIG. 1, which may include the filter adjustment logic section 170 and other components described in detail above.

Accordingly, a position-velocity solution may be improved in a receiver (e.g., 110 of FIG. 1) of a mobile device. An antenna (e.g., 115 of FIG. 1) may receive one or more signals (e.g., 100 of FIG. 1) from one or more satellites (e.g., 105 of FIG. 1). In some embodiments, a method includes producing, by a measurement layer, range and range rate measurements dependent on the one or more signals. The method may include storing, by a storage device, historic satellite measurement states dependent on the range and range rate measurements. The method may include receiving, by a filter logic section, the range and range rate measurements. The method may include smoothing, by the filter logic section, computed motion of the mobile device. The method may include storing, by the storage device, historic filter states. The method may include detecting, by a filter adjustment logic section, a measurement layer error trigger. The method may include removing or de-weighting, by the filter adjustment logic section, errant information associated with the measurement layer error trigger. The method may include causing, by the filter adjustment logic section, the filter logic section to update a current filter state by iteratively applying the filter logic section to the historic filter states.

In some embodiments, the filter logic section is a Kalman filter logic section, the historic filter states are historic Kalman filter states, the filter adjustment logic section is a Kalman filter adjustment logic section, and the current filter state is a current Kalman filter state In some embodiments, the method includes causing, by a storage logic section, the storage device to periodically store the range and range rate measurements in discrete time-based measurement states, wherein the historic satellite measurement states include the discrete time-based measurement states.

In some embodiments, the method includes causing, by the storage logic section, the storage device to periodically store the current filter state in discrete time-based filter states, wherein the historic filter states include the discrete time-based filter states In some embodiments, the method includes running, by the filter adjustment logic section, a Kalman filter update starting from a $K_{S\text{-}T}$ historic filter state from among the historic filter states, wherein T is a predefined number of lapsed seconds relative to a current time.

In some embodiments, the method includes running, by the filter adjustment logic section, the Kalman filter update by iteratively applying the filter logic section to the historic filter states ending with a improved filter state $K_{SO}$, wherein the improved filter state $K_{SO}$ is an updated current filter state associated with a current time In some embodiments, the method includes removing or de-weighting, by the filter adjustment logic section, the errant information associated with the historic satellite measurement states responsive to the measurement layer error trigger In some embodiments, the method includes running, by the filter adjustment logic section, the Kalman filter update while referencing the historic satellite measurement states after the errant information has been removed or de-weighted from the historic satellite measurement states In some embodiments, the method includes receiving, by the filter adjustment logic section, the measurement layer error trigger from the measurement layer In some embodiments, the historic satellite measurement states include $M_{P\text{-}T}, \ldots, M_{P\text{-}3}, M_{P\text{-}2}, M_{P\text{-}1}, M_{P0}$, and the historic filter states include $K_{S\text{-}T}, \ldots, K_{S\text{-}3}, K_{S\text{-}2}, K_{S\text{-}1}, K_{SO}$.

In some embodiments, the method includes receiving, by the filter adjustment logic section, the historic satellite measurement states $M_{P\text{-}T}, \ldots, M_{P\text{-}3}, M_{P\text{-}2}, M_{P\text{-}1}, M_{P0}$ and the historic filter states $K_{S\text{-}T}, \ldots, K_{S\text{-}3}, K_{S\text{-}2}, K_{S\text{-}1}, K_{SO}$ from the storage device. In some embodiments, the method includes causing an update, by the filter adjustment logic section, of the current filter state by iteratively applying the filter logic section to the historic filter states $K_{S\text{-}T}, \ldots, K_{S\text{-}3}, K_{S\text{-}2}, K_{S\text{-}1}, K_{SO}$ for each second in past time while referencing the historic satellite measurement states $M_{P\text{-}T}, \ldots, M_{P\text{-}3}, M_{P\text{-}2}, M_{P\text{-}1}, M_{P0}$ after the errant information has been removed or de-weighted from the historic satellite measurement states $M_{P\text{-}T}, \ldots, M_{P\text{-}3}, M_{P\text{-}2}, M_{P\text{-}1}, M_{P0}$ In the absence of the measurement layer error trigger, the method may include running, by the filter logic section, a Kalman filter $K_{TH}$ state update to update a current Kalman filter state $K_{SO}$ for a current time $T_K$ without iteratively applying the filter logic section to the historic filter states stored in the storage device In some embodiments, the method includes removing from consideration or de-weighting, by the filter adjustment logic section, a satellite signal from among the one or more satellites having associated therewith the errant information During a static period in which position information of the mobile device is not being updated, the method may include reviewing, by the filter adjustment logic section, the historic filter states in view of different combinations of the one or more signals from the one or more satellites, and improving a position solution based on the reviewing.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts.

Further, the blocks, units and/or modules of the embodiments may be physically combined into more complex blocks, units and/or modules without departing from the scope of the inventive concepts.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the embodiments. What is claimed as the invention, therefore, is all such modifications as may come within the scope and spirit of the following claims and equivalents thereto.

What is claimed is:

1. A receiver of a mobile device, comprising:
a filter logic section configured to receive range and range rate measurements, and to smooth computed motion of the mobile device, wherein a storage device is configured to store historic filter states; and
a filter adjustment logic section configured to detect a measurement layer error trigger, to perform one of removing and de-weighting errant information associated with the measurement layer error trigger, and to cause the filter logic section to update a current filter state by iteratively applying the filter logic section to the historic filter states from a previous time to a current time.

2. The receiver of the mobile device of claim 1, further comprising:
an antenna configured to receive one or more signals from one or more satellites;
a measurement layer configured to produce the range and range rate measurements dependent on the one or more signals; and
the storage device, wherein the storage device is configured to store historic satellite measurement states dependent on the range and range rate measurements.

3. The receiver of the mobile device of claim 2, wherein:
the filter logic section is a Kalman filter logic section;
the historic filter states are historic Kalman filter states;
the filter adjustment logic section is a Kalman filter adjustment logic section; and
the current filter state is a current Kalman filter state.

4. The receiver of the mobile device of claim 2, further comprising a storage logic section communicatively coupled to the measurement layer, and configured to cause the storage device to periodically store the range and range rate measurements in discrete time-based measurement states, wherein the historic satellite measurement states include the discrete time-based measurement states.

5. The receiver of the mobile device of claim 4, wherein the storage logic section is communicatively coupled to the filter logic section, and configured to cause the storage device to periodically store the current filter state in discrete time-based filter states, wherein the historic filter states include the discrete time-based filter states.

6. The receiver of the mobile device of claim 5, wherein the filter adjustment logic section is configured to run a Kalman filter update starting from a $K_{S-T}$ historic filter state from among the historic filter states, wherein T is a predefined number of lapsed seconds relative to the current time.

7. The receiver of the mobile device of claim 6, wherein the filter adjustment logic section is configured to run the Kalman filter update by iteratively applying the filter logic section to the historic filter states ending with an improved filter state $K_{SO}$, wherein the improved filter state $K_{SO}$ is an updated current filter state associated with the current time.

8. The receiver of the mobile device of claim 7, wherein the filter adjustment logic section is configured to remove or de-weight the errant information associated with the historic satellite measurement states responsive to the measurement layer error trigger.

9. The receiver of the mobile device of claim 8, wherein the filter adjustment logic section is configured to run the Kalman filter update while referencing the historic satellite measurement states after the errant information has been removed or de-weighted from the historic satellite measurement states.

10. The receiver of the mobile device of claim 2, wherein the filter adjustment logic section is configured to receive the measurement layer error trigger from the measurement layer.

11. The receiver of the mobile device of claim 2, wherein:
the historic satellite measurement states include $M_{P-T}, \ldots, M_{P-3}, M_{P-2}, M_{P-1}, M_{P0}$;
the historic filter states include $K_{S-T}, K_{S-3}, K_{S-2}, K_{S-1}, K_{SO}$;
the filter adjustment logic section is configured to receive the historic satellite measurement states $M_{P-T}, \ldots, M_{P-3}, M_{P-2}, M_{P-1}, M_{P0}$ and the historic filter states $K_{S-T}, \ldots, K_{S-3}, K_{S-2}, K_{S-1}, K_{SO}$ from the storage device, and to cause the filter logic section to update the current filter state by iteratively applying the filter logic section to the historic filter states $K_{S-T}, K_{S-3}, K_{S-2}, K_{S-1}, K_{SO}$ for each second in past time while referencing the historic satellite measurement states $M_{P-T}, \ldots, M_{P-3}, M_{P-2}, M_{P-1}, M_{P0}$ after the errant information has been removed or de-weighted from the historic satellite measurement states $M_{P-T}, \ldots, M_{P-3} M_{P-2} M_{P-1}, M_{P0}$.

12. The receiver of the mobile device of claim 2, wherein in the absence of the measurement layer error trigger, the filter logic section is configured to run a Kalman filter $K_{TH}$ state update to update a current Kalman filter state $K_{SO}$ for a current time $T_K$ without iteratively applying the filter logic section to the historic filter states stored in the storage device.

13. The receiver of the mobile device of claim 3, wherein the filter adjustment logic section is configured to remove from consideration or de-weight a satellite signal from among the one or more satellites having associated therewith the errant information.

14. The receiver of the mobile device of claim 2, wherein during a static period in which position information of the mobile device is not being updated, the filter adjustment logic section is configured to review the historic filter states in view of different combinations of the one or more signals from the one or more satellites to improve a position solution.

15. A method for improving a position-velocity solution in a receiver of a mobile device, comprising:
receiving, by an antenna, one or more signals from one or more satellites;
producing, by a measurement layer, range and range rate measurements dependent on the one or more signals;
storing, by a storage device, historic satellite measurement states dependent on the range and range rate measurements;
receiving, by a filter logic section, the range and range rate measurements;
smoothing, by the filter logic section, computed motion of the mobile device;
storing, by the storage device, historic filter states;
detecting, by a filter adjustment logic section, a measurement layer error trigger;
removing or de-weighting, by the filter adjustment logic section, errant information associated with the measurement layer error trigger; and
causing, by the filter adjustment logic section, the filter logic section to update a current filter state by iteratively applying the filter logic section to the historic filter states.

16. The method of claim 15, wherein:
the filter logic section is a Kalman filter logic section;
the historic filter states are historic Kalman filter states;
the filter adjustment logic section is a Kalman filter adjustment logic section; and
the current filter state is a current Kalman filter state.

17. The method of claim 15, further comprising causing, by a storage logic section, the storage device to periodically store the range and range rate measurements in discrete time-based measurement states, wherein the historic satellite measurement states include the discrete time-based measurement states.

18. The method of claim 17, further comprising causing, by the storage logic section, the storage device to periodically store the current filter state in discrete time-based filter states, wherein the historic filter states include the discrete time-based filter states.

19. The method of claim 18, further comprising running, by the filter adjustment logic section, a Kalman filter update starting from a $K_{S-T}$ historic filter state from among the historic filter states, wherein T is a predefined number of lapsed seconds relative to a current time.

20. The method of claim 19, further comprising running, by the filter adjustment logic section, the Kalman filter update by iteratively applying the filter logic section to the historic filter states ending with a improved filter state $K_{SO}$, wherein the improved filter state $K_{SO}$ is an updated current filter state associated with a current time.

21. The method of claim 20, further comprising removing or de-weighting, by the filter adjustment logic section, the errant information associated with the historic satellite measurement states responsive to the measurement layer error trigger.

22. The method of claim 21, further comprising running, by the filter adjustment logic section, the Kalman filter update while referencing the historic satellite measurement states after the errant information has been removed or de-weighted from the historic satellite measurement states.

23. The method of claim 15, further comprising receiving, by the filter adjustment logic section, the measurement layer error trigger from the measurement layer.

24. The method of claim 15, wherein:
the historic satellite measurement states include $M_{P-T}, \ldots, M_{P-3}, M_{P-2}, M_{P-1}, M_{P0}$;
the historic filter states include $K_{S-T}, \ldots, K_{S-3}, K_{S-2} K_{S-1}, K_{SO}$; and
the method further comprises:
receiving, by the filter adjustment logic section, the historic satellite measurement states $M_{P-T} M_{P-3}, M_{P-2}, M_{P-1}, M_{P0}$ and the historic filter states $K_{S-T}, \ldots, K_{S-3}, K_{S-2}, K_{S-1}, K_{SO}$ from the storage device; and
causing an update, by the filter adjustment logic section, of the current filter state by iteratively applying the filter logic section to the historic filter states $K_{S-T}, K_{S-3}, K_{S-2}, K_{S-1}, K_{SO}$ for each second in past time while referencing the historic satellite measurement states $M_{P-T}, \ldots, M_{P-3}, M_{P-2}, M_{P-1}, M_{P0}$ after the errant information has been removed or de-weighted from the historic satellite measurement states $M_{P-T}, \ldots, M_{P-3}, M_{P-2}, M_{P-1}, M_{P0}$.

25. The method of claim 15 further comprising in the absence of the measurement layer error trigger, running, by the filter logic section, a Kalman filter $K_{TH}$ state update to update a current Kalman filter state $K_{SO}$ for a current time $T_K$ without iteratively applying the filter logic section to the historic filter states stored in the storage device.

26. The method of claim 15, further comprising removing from consideration or de-weighting, by the filter adjustment logic section, a satellite signal from among the one or more satellites having associated therewith the errant information.

27. The method of claim 15, further comprising:
during a static period in which position information of the mobile device is not being updated, reviewing, by the filter adjustment logic section, the historic filter states in view of different combinations of the one or more signals from the one or more satellites; and
improving a position solution based on the reviewing.

* * * * *